US012604373B2

(12) United States Patent
Cabeza Gozalo et al.

(10) Patent No.: US 12,604,373 B2
(45) Date of Patent: Apr. 14, 2026

(54) INDUCTION DEVICE

(71) Applicant: BSH Hausgeräte GmbH, Munich (DE)

(72) Inventors: Tomas Cabeza Gozalo, Saragossa (ES); Alberto Dominguez Vicente, Saragossa (ES); Jorge Español Leza, Saragossa (ES); Manuel Fernandez Martinez, Saragossa (ES); Sergio Llorente Gil, Saragossa (ES); Ramon Peinado Adiego, Saragossa (ES); Jorge Villa Lopez, Jaca (ES)

(73) Assignee: BSH Hausgeräte GmbH, Munich (DE)

( * ) Notice: Subject to any disclaimer, the term of this patent is extended or adjusted under 35 U.S.C. 154(b) by 995 days.

(21) Appl. No.: 17/779,585

(22) PCT Filed: Dec. 2, 2020

(86) PCT No.: PCT/EP2020/084249

§ 371 (c)(1),
(2) Date: May 25, 2022

(87) PCT Pub. No.: WO2021/115871

PCT Pub. Date: Jun. 17, 2021

(65) Prior Publication Data

US 2023/0009984 A1 Jan. 12, 2023

(30) Foreign Application Priority Data

Dec. 13, 2019 (EP) .................................... 19383109

(51) Int. Cl.
*H05B 6/12* (2006.01)
*H05B 6/06* (2006.01)

(52) U.S. Cl.
CPC .......... *H05B 6/1236* (2013.01); *H05B 6/062* (2013.01)

(58) Field of Classification Search
CPC .......... H05B 6/062; H05B 6/065; H05B 6/08; H05B 6/1236
See application file for complete search history.

(56) References Cited

FOREIGN PATENT DOCUMENTS

| | | | | |
|---|---|---|---|---|
| EP | 3001773 A1 | | 3/2016 | |
| EP | 3484242 A1 | * | 5/2019 | ............. H05B 6/065 |
| EP | 3565379 A1 | | 11/2019 | |
| WO | 2011055283 A1 | | 5/2011 | |

OTHER PUBLICATIONS

EP 3484242 A1 (Abellanas Sanchez Andres) May 15, 2019 [retrieved on Jul. 1, 2025]. Retrieved from Espacenet Database, translation by EPO and Google (Year: 2019).*
International Search Report PCT/EP2020/084249 dated Feb. 16, 2021.

* cited by examiner

*Primary Examiner* — Edward F Landrum
*Assistant Examiner* — Theodore J Evangelista
(74) *Attorney, Agent, or Firm* — Michael E. Tchupp; Andre Pallapies; Brandon G. Braun

(57) ABSTRACT

An induction device includes a plurality of induction areas which can be controlled independently from one another, and a control unit configured to control the plurality of induction areas within a control period from a first control interval and a second control interval repetitively with an alternating current frequency and to supply the plurality of induction areas with energy. The control unit operates in the first control interval at least two of the plurality of induction areas with a first phase shift to minimize interference.

19 Claims, 6 Drawing Sheets

INDUCTION DEVICE

CROSS-REFERENCES TO RELATED APPLICATIONS

This application is the U.S. National Stage of International Application No. PCT/EP2020/084249, filed Dec. 2, 2020, which designated the United States and has been published as International Publication No. WO 2021/115871 A1 and which claims the priority of European Patent Application, Serial No. 19383109.6, filed Dec. 13, 2019, pursuant to 35 U.S.C. 119(a)-(d).

The contents of International Application No. PCT/EP2020/084249 and European Patent Application, Serial No. 19383109.6 are incorporated herein by reference in their entireties as if fully set forth herein.

BACKGROUND OF THE INVENTION

The invention relates to an induction device and to a method for operating an induction device.

An induction cooking appliance device with at least one control and/or regulating unit is already known from the prior art and is provided to repetitively control and supply with energy at least one induction area in at least one periodic continuous heating operating state, to which at least one operating period is assigned, and to operate the induction area in at least one switch-on interval of the operating period with a heating output, in particular an area heating output or an excess of power with respect to an area heating output, wherein the control and/or regulating unit is provided to vary a heating current frequency for the induction area in the switch-on interval of the operating period in the continuous heating operating state in order thus to enable a low-noise operation.

Furthermore, the prior art already discloses an induction cooking appliance device having at least two induction heating elements and at least one control unit, which, in at least one operating state, operates the induction heating elements in at least one first time interval with a first phase shift and in at least one second time interval which differs from the first time interval with a second phase shift which differs from the first phase shift, in order thus to enable an improved heat distribution.

BRIEF SUMMARY OF THE INVENTION

The object of the invention consists in particular in, but is not restricted to, providing a generic device with improved properties with respect to a safe and/or convenient operation.

The invention is based on an induction device, in particular an induction cooking appliance device, with a plurality of induction areas which can be controlled independently, and with at least one control unit, which is provided to repetitively control the induction areas within a control period from a first control interval and at least one second control interval with at least one alternating current frequency and to supply the same with energy.

In order to minimize interference, it is proposed that in the first control interval the control unit operates at least two of the induction areas with a first phase shift.

By means of the inventive embodiment, provision can be made for a generic cooking appliance device with improved properties in respect of a safe and/or convenient operation, in particular a low-noise operation and/or in particular in respect of complying with EMC standards and/or a flicker compliance. In particular, interference noises resulting from intermodulations can advantageously be minimized. As a result, an unfavorable acoustic stress for an operator can in particular be avoided, as a result of which in particular high operator convenience and in particular a positive operator impression can be achieved with the operator in particular with respect to an acoustic quality. Furthermore, an induction device with improved compliance compared to statutory directives, in particular directives with respect to EMC compliance and/or flicker compliance, can advantageously be achieved with simple technical means. Further advantageously, stricter limit values with respect to EMC compliance which are planned for the future can moreover also already be adhered to at this time.

An "induction device" is to be understood to mean in particular at least one part, in particular a sub-assembly of an induction device, which has a main function in the form of an energy transfer to at least one external unit. The induction device could be embodied for instance as a part and/or a sub-assembly of an induction charging device, wherein the external unit could have at least one receiving element, for instance a secondary coil, and could be embodied for instance as a hand-held power tool, such as, for instance, a drill and/or an electrical screwdriver and/or a hammer drill and/or a saw, or as a mobile device such as, for instance, a smart phone and/or tablet and/or laptop. Alternatively or in addition, the induction device could be embodied as a part of a transformer and in particular could comprise at least one primary coil of a transformer. The induction device is preferably provided as an induction cooking appliance device, for instance as an induction oven device or as an induction grill device and particularly preferably as an induction hob device, and for heating the external unit, which can be embodied in particular as an item of cookware.

An "induction area" should be understood to mean in particular an inductor or a plurality of inductors, which is/are part of the induction device and which can be controlled together by the control unit. Here an "inductor" should be understood to mean in particular an element which has at least one induction coil and which is provided to supply energy, in particular in the form of a magnetic alternating field, in at least one operating state at least to a receiving element, in particular a receiving element of the external unit. In the case of an induction device embodied as an induction cooking appliance device, an induction area can be provided in particular to supply energy to the receiving element for the purpose of heating. In this case, the external unit could be embodied for instance as an item of cookware and have at least one secondary coil as a receiving element for receiving the energy provided by the inductor. Alternatively or in addition, the receiving element could also be embodied as a metallic heating means, in particular as an at least partially ferromagnetic heating means, for instance as a ferromagnetic base of an item of cookware, in which, in the operating state, eddy currents and/or remagnetization effects are produced by the inductor and are converted into heat. In particular, the multiplicity of inductors can be arranged in a matrix-type manner, wherein the inductors arranged in a matrix-type manner can form a variable cooktop. At least one inverter unit is assigned in particular to each of the induction areas and can be embodied in particular as a resonance inverter and/or as a dual half-bridge inverter. The inverter unit comprises in particular at least two switching elements, which can be controlled separately by the control unit. A "switching element" should be understood to mean in particular an element, which is provided to establish and/or separate an electrically conducting connection between two points, in particular contacts of the switching element. The switching element preferably has at least one control contact, by way of which it can be connected. In particular, the switching element is embodied as a semiconductor switching element, in particular as a transistor, for instance as a metal oxide semiconductor field effective transistor (MOSFET) or organic field effect transistor (OFET), advantageously as a bipolar transistor preferably with an insulated gate electrode (IGBT). Alternatively, it is conceivable for the switching element to be embodied as a mechanical and/or electromechanical switching element, in particular as a relay.

A "control unit" should be understood to mean in particular an electronic unit, which is integrated at least partially into the induction device and which is provided in particular to control at least one of the inverter units. Preferably, the control unit comprises a computing unit and in particular, in addition to the computing unit, a storage unit with at least one control program stored therein, which is provided to be executed by the computing unit. A "control period" should be understood to mean in particular a period of time during which the control unit repetitively controls the induction areas by applying at least one control strategy. A "control strategy" is to be understood to mean in particular a special control of a unit, in particular of at least two induction areas, and/or a special method and/or a special algorithm, which is applied to the unit, in particular to the induction areas. The control strategy can comprise in particular at least one phase shift. A "control interval" should be understood to mean in particular a part period of the control period in which the control unit controls the induction areas with precisely one specific control strategy and retains this control strategy during this part period. During a control interval, a number of the induction areas operated simultaneously by the control unit is in particular constant. In connection with the control interval, the terms "first", "second", "further" are to be understood purely as a nomenclature to aid an improved distinction between the respective control intervals and do not imply a time sequence and/or ranking order of the respective control intervals. For instance, the first control interval can be arranged downstream of the second control interval and/or further control intervals or vice versa. In particular, the first control interval can be shorter or longer than the second control interval and/or further control intervals or all control intervals can last a similar duration in each case.

An "alternating current frequency" should be understood to mean in particular a frequency of an electrical alternating current in a range from 20 kHz to 150 kHz, preferably from 30 kHz to 75 kHz, with which at least one inductor of an induction area is controlled in order to generate a magnetic alternating field.

Interferences can be influences which can be perceived by a user and are perceived as unwanted and/or influences which are not permitted on account of statutory regulations. For instance, interferences could be embodied as flickers. Alternatively or in addition, interferences could be unwanted acoustic influences, in particular in a frequency range between 20 Hz and 20 kHz which can be perceived by an average human ear. Interferences could be caused in particular by intermodulations and present themselves as acoustically perceptible interference noises. "Intermodulations" should be understood to mean in particular sum products and/or differential products of individual alternating current frequencies or their nth harmonics, wherein n stands for a whole number greater than zero. Interferences can furthermore, alternatively or in addition, be caused by an occurrence of a ripple current, in other words an alternating current of any frequency and curve shape, which overlays a direct current, and manifests itself in an unwanted humming tone. Interferences in this context contain in particular no technical interferences, defects and/or other unwanted phenomena, such as, for instance, a non-uniform heat distribution.

A "phase shift" should be understood to mean in particular that an oscillation of a control signal of a first inverter unit, with which a first induction area is controlled, and an oscillation of a further control signal of a further inverter unit, with which a further induction area is controlled, have zero crossings which are spaced apart from one another. In particular, the phase shift assumes an amount which corresponds to a distance of the zero crossings and is specified as a phase angle. The amount of the phase shift should be considered below in each case starting from the control signal, by means of which the control unit in the relevant control interval firstly controls a specific induction area and supplies the same with energy. In connection with the term "phase shift", the terms "first" "second", "further" are to be understood purely as a nomenclature to aid an improved distinction between phase shifts, which differ in respect of an amount and/or the relevant induction areas and/or the relevant control interval. Furthermore, in connection with a phase shift, terms "first", "second", "further" are used for an assignment to a respective control interval, in which a particular phase shift is applied. For instance, a first phase shift and a further first phase shift are used in each case in a first control interval. In particular, the term "first phase shift" does not necessarily imply a presence of a second and/or further phase shift.

"Provided" is to be understood in particular to mean specifically programmed, configured and/or equipped. The fact that an object is intended for a particular function is to be understood to mean in particular that the object fulfills and/or carries out this particular function in at least one application and/or operating state.

Further, it is proposed that the control unit operates the at least two induction areas in the second control interval with a second phase shift which differs from the first phase shift. It would be conceivable, for instance, for the control unit in the first control interval to operate precisely two of the induction areas simultaneously with the first phase shift, for instance offset by a phase angle of 90° with respect to one another, and in the second control interval to operate the two induction areas with the second phase shift, for instance offset by a phase angle of 60° with respect to one another. In this way, interferences in different operating situations can advantageously be minimized, for instance with a different power output of the induction areas.

It is moreover proposed that the control unit, in the first control interval, operates at least a further one of the induction areas with a further first phase shift. For instance, it would be conceivable for the control unit in the first control interval to operate three induction areas simultaneously, namely a second induction area with the first phase shift with respect to a first induction area and a further induction area with the further first phase shift with respect to the first induction area. In this way, interference influences in different operating situations, for instance with a different number of induction areas to be operated simultaneously, can be minimized.

It is further proposed that the control unit, in the second control interval, operates at least a further one of the induction areas with a further second phase shift. For instance, it would be conceivable for the control unit in the first control interval to operate precisely two induction areas simultaneously with the first phase shift and in the second control interval three induction areas simultaneously, namely a second induction area with the second phase shift with respect to a first induction area and a further induction area with the further second phase shift with respect to the first induction area. In this way, interferences in different operating situations, for instance with a different number of induction areas operated simultaneously, can be minimized.

Furthermore, it is proposed that a duration of at least one of the control intervals, in particular all control intervals, is in each case shorter than half a cycle time of a mains alternating voltage. In this way, it is possible advantageously, in particular very quickly and in particular automatically by means of the control unit, to respond to a changed operating situation, for instance a switching on and/or off of individual induction areas by a user and at the same to minimize interferences. Furthermore, it is proposed that a duration of the control period is shorter than half a cycle time of a mains alternating voltage. In this way, a flicker compliance can advantageously be improved.

Moreover, it is proposed that the control unit in at least one of the control intervals controls at least one of the induction areas with the alternating current frequency and at least a further one of the induction areas with a further alternating current frequency which differs from the alternating current frequency. It is conceivable, for instance, for the control unit in the first control interval to control the at least two induction areas with the alternating current frequency and in the second control interval to control one of the two same induction areas with the alternating current frequency and the other of the two same induction areas with the further alternating current frequency. Alternatively, it is conceivable for the control unit in the first control interval to control the at least two induction areas with the alternating current frequency and in the second control interval to control one of the two same induction areas with the alternating current frequency and further induction area, which was not controlled in the first control interval, with the further alternating current frequency. In this way, a number of induction areas can advantageously be operated simultaneously with different power outputs and interferences can be minimized at the same time.

It would be conceivable, for instance, for the alternating current frequency and the further alternating current frequency to be spaced apart by a specific amount, in particular by an amount of at least 20 kHz, without the alternating current frequency and the further alternating current frequency here having a common integral multiple. In order advantageously to enable a phase shift also in the case of two induction areas operated at a different alternating current frequency, it is proposed that the further alternating current frequency is an integral multiple of the alternating current frequency. For instance, the alternating current frequency, with which the first two induction areas are operated, could be 35 kHz and the further alternating current frequency, with which a further induction area is operated, could be 70 kHz. In this way interferences can advantageously be minimized in particular also in such cases in which at least two induction areas of the induction device have to be operated with different alternating current frequencies for technical reasons, for instance on account of different output powers.

It is further proposed that the control unit operates with the same alternating current frequency in at least one of the control intervals, in particular the first control interval, at least two of the induction areas, in particular the at least two induction areas. With the same alternating current frequency, a phase shift can advantageously be realized with in particular simple technical means and at the same time a minimization of interferences can be achieved.

Moreover, it is proposed that the control unit calculates a phase angle of the first phase shift from a quotient of 180° and a number of induction areas to be operated simultaneously within the first control interval. In particular, the control unit calculates all phase angles of all phase shifts from 180° and a number of induction areas to be operated simultaneously within the first control interval. In order to calculate the phase angle, the control unit comprises in particular a computing unit. For instance, in one of the control intervals, two induction areas could be operated simultaneously, so that the computing unit of the control unit calculates the phase angle, from 180° divided by two, at 90°. In this way interferences, which can differ significantly in particular depending on the number of induction areas operated simultaneously within a control interval, can advantageously be minimized by the control unit, in particular automatically.

In an alternative embodiment, it is proposed that the control unit selects at least one suitable phase angle for the first phase shift from a catalog of suitable phase angles on the basis of a number of induction areas to be operated simultaneously within the first control interval. In particular, the control unit selects in each case at least one suitable phase angle for the respective phase shift from a catalog of suitable phase angles on the basis of a number of induction areas to be operated simultaneously within a respective control interval. The control unit comprises in particular at least one storage unit in which the catalog is stored for retrieval by the control unit. The catalog can contain in particular a multiplicity of suitable phase angles which are determined in particular experimentally by tests. In particular, it is conceivable that with the multiplicity of phase angles stored in the catalog, in addition to the number of induction areas to be operated simultaneously, further factors, for instance a number of inductors, which are assigned to the respective induction areas, and/or a diameter and/or a winding number of a coil of an inductor, are taken into account. In particular, it is conceivable for the phase angles contained in the catalog to be adjusted to a special application of the induction device, for instance a particular operating mode. In particular, a first catalog of a first induction device, which is part of a first induction appliance, can differ from a second catalog of a second induction device, which is part of a second induction appliance which differs from the first, in particular in respect of an application field. In particular, it is conceivable for the catalog to be expandable and/or adjustable by further suitable phase angles, so that new empirical insight in respect of suitable phase angles can be added by means of a software update, for instance.

The invention is further based on a method for operating an induction device, in particular an induction cooking appliance device, having a plurality of induction areas which can be controlled independently, wherein within a control period the induction areas are controlled repetitively from at least two consecutive control intervals with at least one alternating current frequency and are supplied with energy.

It is proposed that in order to minimize interference influences in at least one of the control intervals, at least two of the induction areas are operated with a phase shift. In this way, a particularly low-noise operation of the induction device can advantageously be achieved.

The induction device should not be restricted here to the afore-described application and embodiment. In particular, in order to fulfill a mode of operation described herein the induction device may have a number of individual elements, components and units which differs from a number cited herein.

Further advantages will emerge from the following description of the drawings. The drawing shows exemplary embodiments of the invention. The drawing, the description and the claims contain numerous features in combination. The person skilled in the art will expediently also consider the features individually and combine them to form useful further combinations.

DETAILED DESCRIPTION OF EXEMPLARY EMBODIMENTS OF THE PRESENT INVENTION

Figure 1:
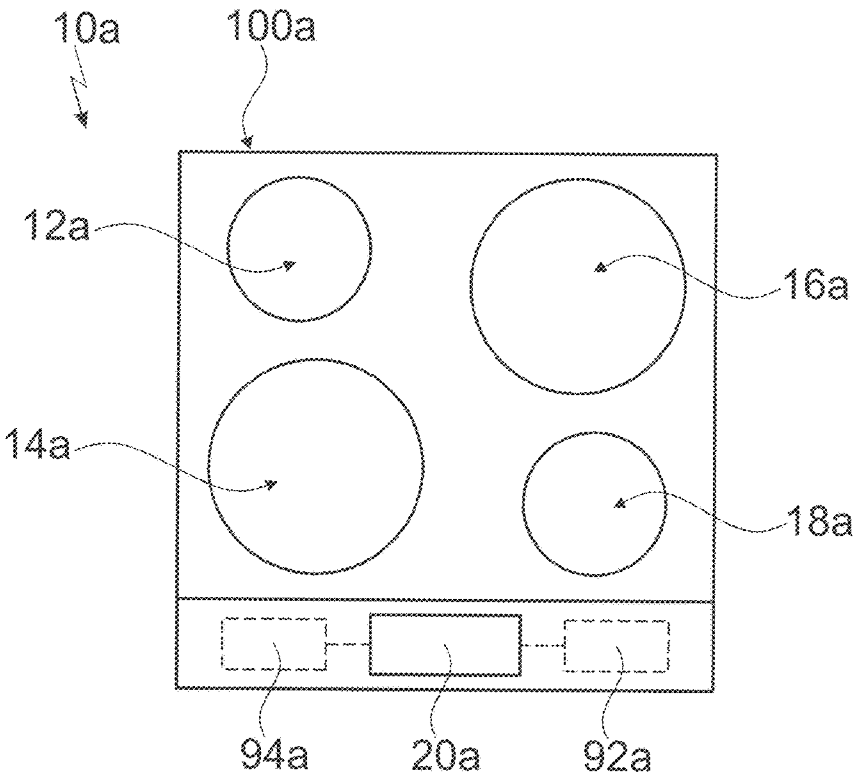
FIG. 1 shows a schematic diagram of an induction appliance with an induction device, which has a plurality of induction areas and a control unit.

FIG. 1 shows an induction appliance 100*a* with an induction device 10*a*. The induction appliance 100*a* is embodied as an induction cooking appliance, namely as an induction hob. The induction device 10*a* is embodied as an induction cooking appliance device. The induction device 10*a* has a plurality of induction areas 12*a*, 14*a*, 16*a*, 18*a*. The induction device 10*a* has a control unit 20*a*. The induction areas 12*a*, 14*a*, 16*a*, 18*a* can be controlled independently by the control unit 20*a*. The control unit 20*a* is provided to control the induction areas 12*a*, 14*a*, 16*a*, 18*a* within a control period 22*a* (cf. FIG. 4) repetitively with at least one alternating current frequency 24*a* and to supply the same with energy. The control unit 20*a* has a computing unit 92*a* and a storage unit 94*a*.

Figure 2:
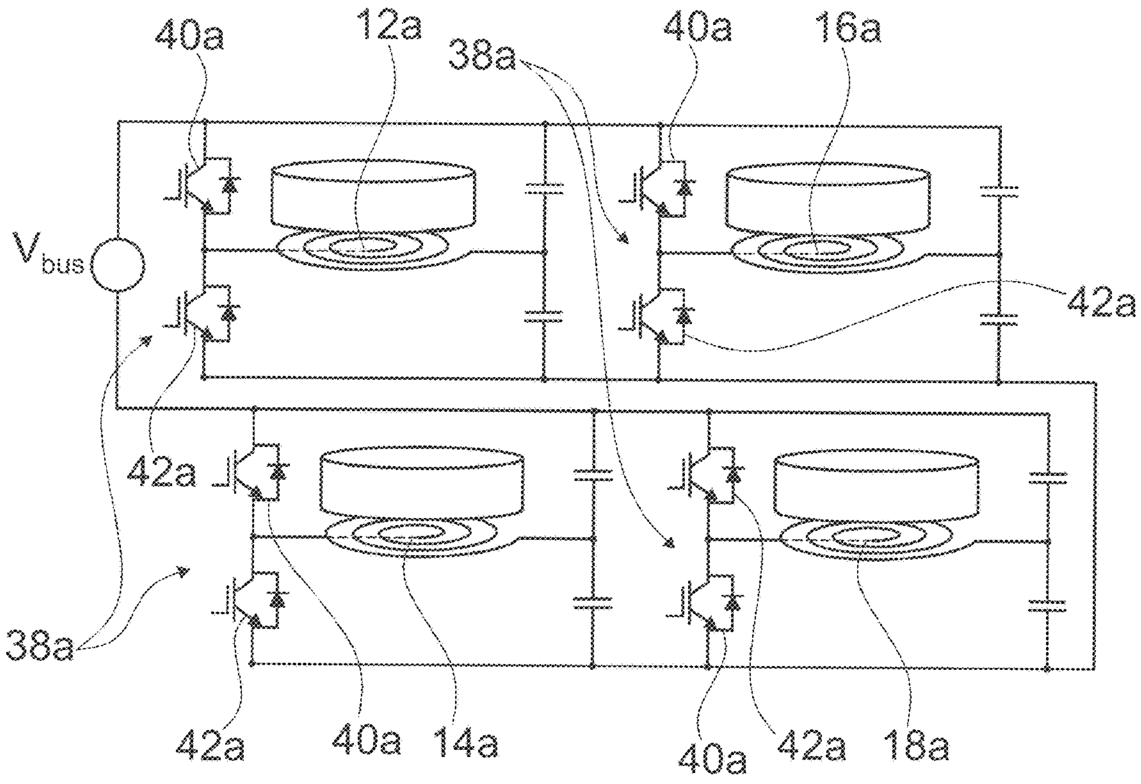
FIG. 2 shows a circuit diagram of the induction device in a schematic representation.

FIG. 2 shows a circuit diagram of the induction device 10*a* in a schematic representation. An inverter 38*a* is assigned to each of the induction areas 12*a*, 14*a*, 16*a* and 18*a* in each case. Each of the inverter units 38*a* has a first switching element 40*a* and a second switching element 42*a*. The first switching element 40*a* and the second switching element 42*a* are embodied in each case as transistors, namely as bipolar transistors with insulated gate electrodes. In one operating state, the control unit 20*a* controls the respective induction areas 12*a*, 14*a*, 16*a*, 18*a* repetitively by way of the inverter units 38*a* assigned to the respective induction areas 12*a*, 14*a*, 16*a*, 18*a* with the alternating current frequency 24*a*.

Figure 3:
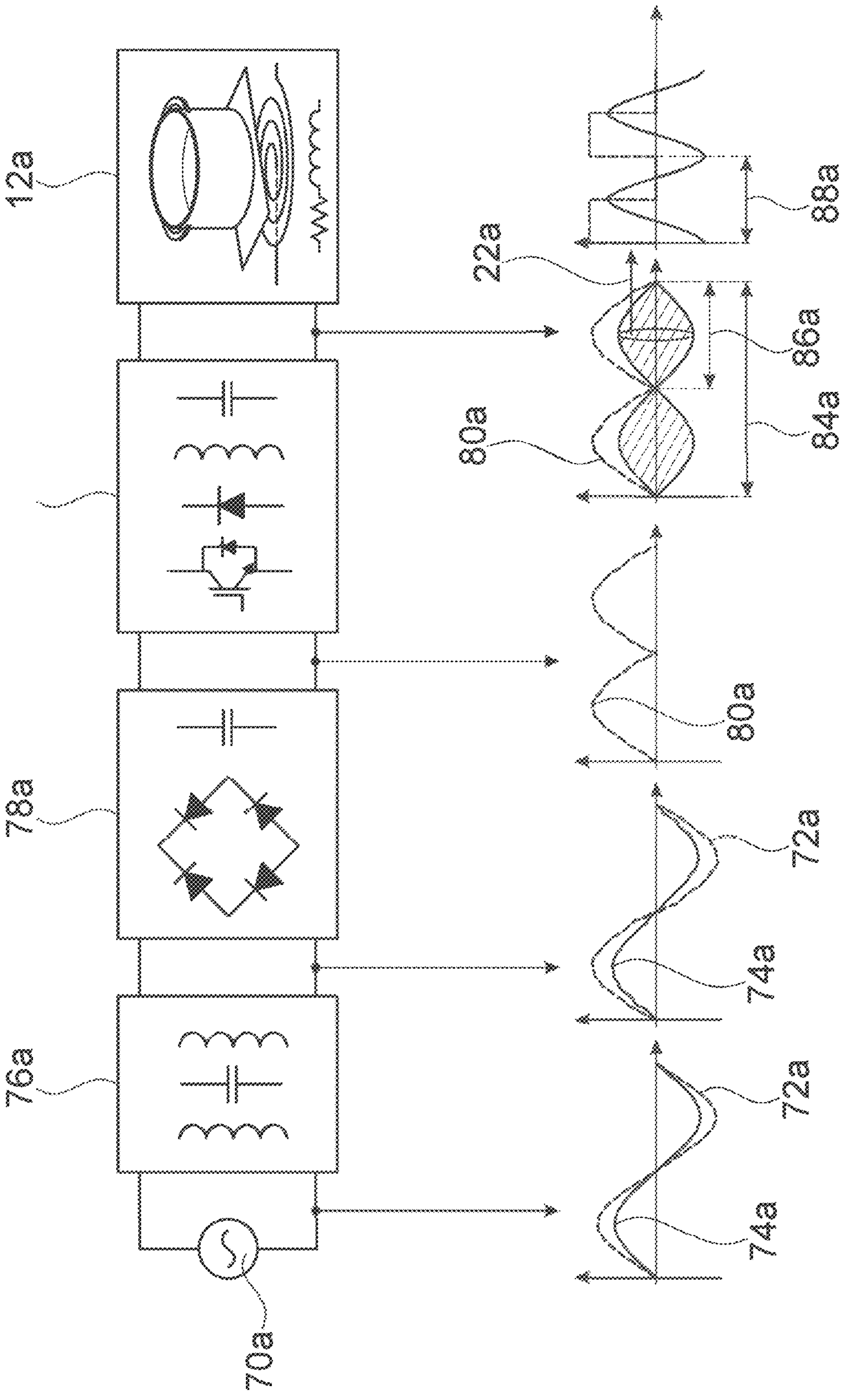
FIG. 3 shows the induction device in a schematic representation with a connection to a mains voltage source.

FIG. 3 shows the induction device 10*a* in a schematic representation. The induction device 10*a* is connected to a mains alternating voltage source 70*a*. The mains alternating voltage source 70*a* provides a mains alternating voltage 72*a* or a mains alternating current 74*a*. The induction device 10*a* has a filter unit 76*a* and a rectifier unit 78*a*. The rectifier unit 78*a* converts the mains alternating voltage 72*a* into a direct voltage 80*a*. The direct voltage 80*a* has a cycle time 84*a*, which corresponds to a cycle time of the mains alternating voltage 72*a*. A duration 88*a* of the control period 22*a* is shorter than half a cycle time 86*a* of the mains alternating voltage 72*a*. The control period 22*a* consists of a number of control intervals 26*a*, 28*a*, 30*a*. The duration of all control intervals 26*a*, 28*a* and 30*a* adds up to the duration of the control period 22*a* (cf. FIG. 4). Hence, a duration of all control intervals 26*a*, 28*a*, 30*a* is shorter than half the cycle time 86*a* of the mains alternating voltage 72*a*.

Figure 4:
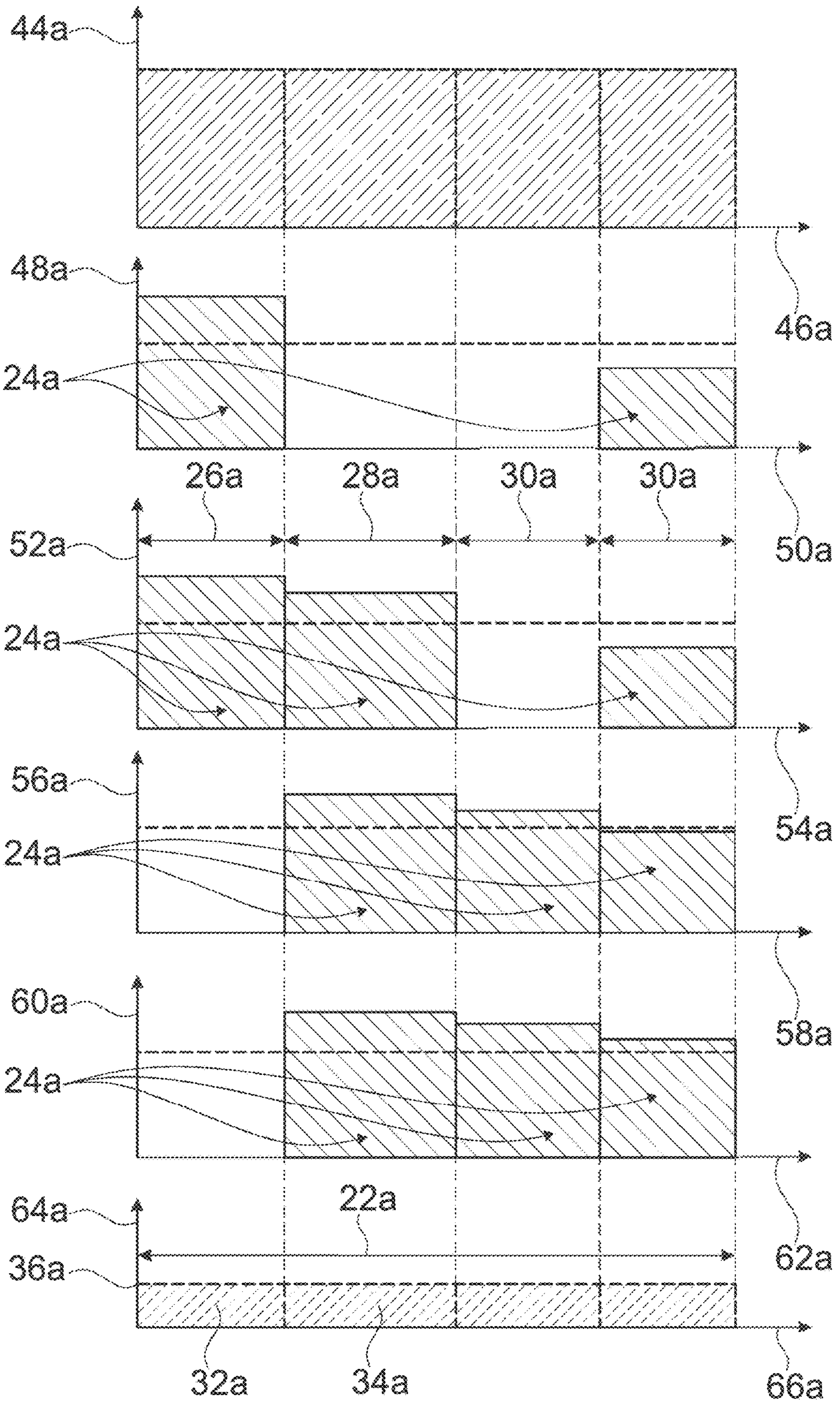
FIG. 4 shows a schematic diagram of a control period of the induction device.

FIG. 4 shows an overview of a number of diagrams for representing the control period 22*a* of the control unit 20*a* in an exemplary operating state of the induction device 10*a*. A time is plotted on an X axis 46*a* of a first diagram. A total power provided inductively by the induction areas 12*a*, 14*a*, 16*a*, 18*a* is shown on a Y axis 44*a* of the first diagram. The control period 22*a* comprises a first control interval 26*a*, a second control interval 28*a* and two further control intervals 30*a*. A time is plotted on an X axis 50*a* of a second diagram. A power provided by the induction area 12*a* of the induction areas 12*a*, 14*a*, 16*a*, 18*a* is plotted on an Y axis 48*a* of the second diagram. A time is plotted on an X axis 54*a* of a third diagram. A power provided by the induction area 14*a* is plotted on a Y axis 52*a* of the third diagram. A time is plotted on an X axis 58*a* of a fourth diagram. A power provided by the induction area 16*a* is plotted on an Y axis 56*a* of the fourth diagram. A time is plotted on an X axis 62*a* of a fifth diagram. A power provided by the induction area 18*a* is plotted on an Y axis 60*a* of the fifth diagram. A time is plotted on an X axis 66*a* of a sixth diagram. A phase angle 36*a* of a phase shift is plotted on a Y axis 64*a* of the sixth diagram. In the first control interval 26*a*, the control unit 20*a* operates the first induction area 12*a* and the second induction area 14*a* with the same alternating current frequency 24*a*. In the first control interval 26*a*, in order to minimize interferences, the control unit 20*a* operates the induction area 14*a* with a first phase shift 32*a* with respect to the induction area 12*a*.

The computing unit 92*a* is used by the control unit 20*a* to compute the phase angle 36*a* of the first phase shift 32*a* from a quotient of 180° and a number of induction areas 12*a*, 14*a*, 16*a*, 18*a* to be operated simultaneously within the first control interval 26*a*. In the first control interval 26*a*, the induction area 12*a* and the induction area 14*a* are to be operated simultaneously by the control unit 20*a*, so that the number of induction areas 12*a*, 14*a* to be operated simultaneously is equal to two. The computing unit 92*a* of the control unit 20*a* computes therefrom the phase angle 36*a* from the quotient of 180° and two and determines an amount of 90° for the phase angle 36*a* of the first phase shift 32*a* in the first control interval 26*a*.

In the second control interval 28*a*, the control unit 20*a* operates the induction area 14*a*, the induction area 16*a*, and the induction area 18*a* simultaneously with the same alternating current frequency 24*a* in each case. In the second control interval 28*a*, the control unit 20*a* operates the induction area 16*a* with a second phase shift 34*a* with respect to the induction area 14*a* and the induction area 18*a* with the second phase shift 34*a* with respect to the induction area 14*a*. The second phase shift 34*a* differs from the first phase shift 32*a*.

Figure 5:
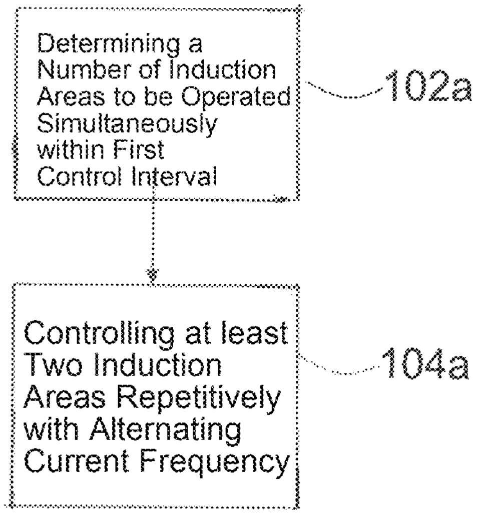
FIG. 5 shows a schematic diagram of a method for operating the induction device.

FIG. 5 shows a schematic representation of a method for operating the induction device 10*a* with a plurality of induction areas 12*a*, 14*a*, 16*a*, 18*a* which can be controlled independently. In a first method step 102*a*, the control unit 20*a* determines a number of induction areas 12*a*, 14*a*, 16*a*, 18*a* to be operated simultaneously within the first control interval 26*a*. In a second method step 104*a*, within the control period 22*a* at least two of the induction areas 12*a*, 14*a*, 16*a*, 18*a* are controlled repetitively with the alternating current frequency 18*a* and supplied with energy. In order to minimize interferences, two of the induction areas 12*a*, 14*a*, 16*a*, 18*a* are operated with the first phase shift 32*a* in the first control interval 26*a*.

Figure 6:
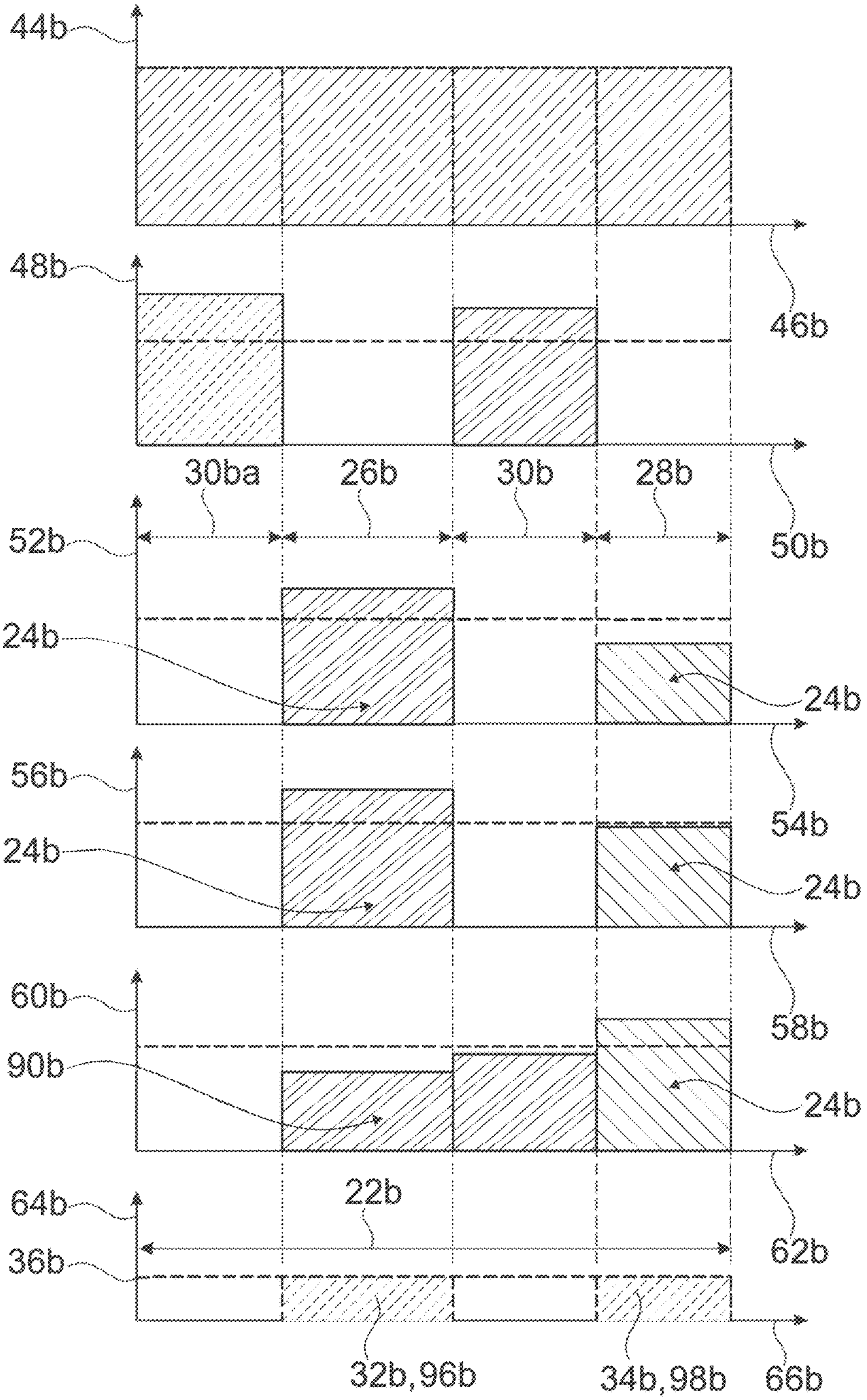
FIG. 6 shows a schematic diagram of a control period of an induction device of an alternative exemplary embodiment and FIG. 7 shows a circuit diagram of a further alternative exemplary embodiment of an induction device in a schematic representation.
Figure 7:
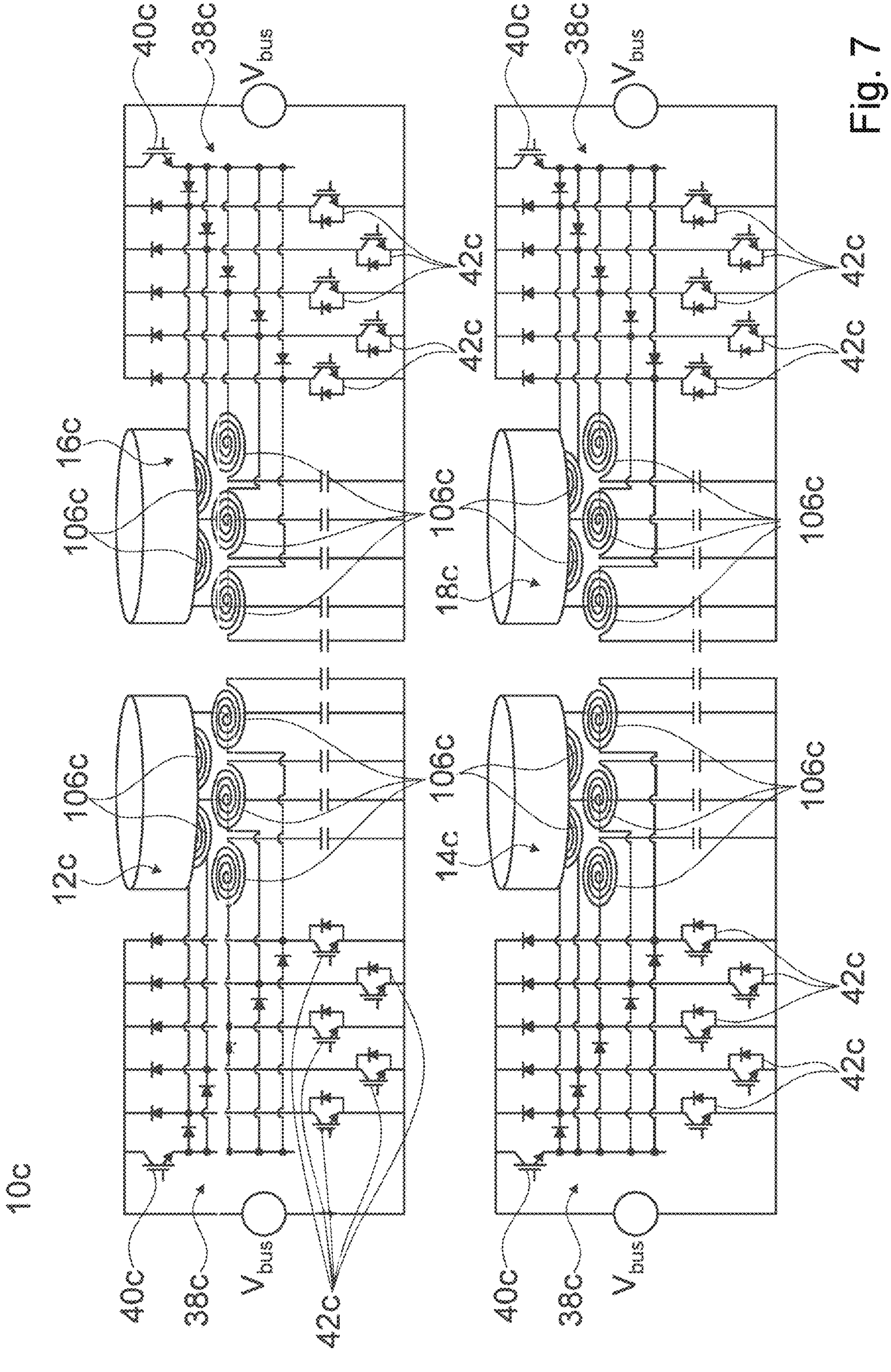

FIGS. 6 and 7 show further exemplary embodiments of the invention. The following descriptions are restricted essentially to the differences between the exemplary embodiments, wherein with regard to components, features and functions which remain the same, reference can be made to the description of the exemplary embodiment in FIGS. 1 to 5. In order to differentiate the exemplary embodiments, the letter a is replaced in the reference characters of the exemplary embodiment in FIGS. 1 to 5 by the letters b and c in the reference characters of the exemplary embodiment in FIGS. 6 and 7. Reference can basically also be made to the drawings and/or the description of the exemplary embodiment in FIGS. 1 to 5, in respect of components labeled the same, in particular in respect of components with identical reference characters.

FIG. 6 relates to a further exemplary embodiment of an induction device. The induction device is configured identically to the induction device 10*a* in respect of a structural design and only differs in respect of a programming of a control unit. FIG. 6 shows an overview of a number of diagrams for representing a control period 22*b* of the control unit in an exemplary operating state. The control period 22*b* comprises a first control interval 26*b*, a second control interval 28*b* and two further control intervals 30*b*. A time is plotted on an X axis 46*b* of a first diagram. A total power provided inductively by the induction areas is shown on a Y axis 44*b* of the first diagram. A time is plotted on an X axis 50*b* of a second diagram. A power provided by the induction area is plotted on a Y axis 48*b* of the second diagram. A time is plotted on an X axis 54*b* of a third diagram. A power provided by the induction area is plotted on a Y axis 52*b* of the third diagram. A time is plotted on an X axis 58*b* of a fourth diagram. A power provided by the third induction area is plotted on a Y axis 56*b* of the fourth diagram. A time is plotted on an X axis 62*b* of a fifth diagram. A power provided by the induction area is plotted on a Y axis 60*b* of the fifth diagram. A time is plotted on an X axis 66*b* of a sixth diagram. A phase angle 36*b* of a phase shift is plotted on a Y axis 64*b* of the sixth diagram. In the first control interval 26*b*, the control unit operates the induction areas with an alternating current frequency 24*b* and the induction area with a further alternating current frequency 90*b*. The further alternating current frequency 90*b* differs from the alternating current frequency 24*b*. The further alternating current frequency 90*b* is an integral multiple of the alternating current frequency 24*b*.

In the first control interval 26*b*, the control unit operates the induction area and the induction area with a first phase shift 32*b*. From a catalog stored in a storage unit 94*b* of the control unit, the control unit determines a suitable phase angle 36*b* for the first phase shift 32*b* from a number of induction areas to be operated simultaneously in the first control interval 26*b*.

In the first control interval 26*b*, the control unit 20*b* operates the further induction area with a further first phase shift 96*b*. In the second control interval 28*b*, the control unit operates the induction areas and the further induction area with the same alternating current frequency 24*b* in each case. The control unit operates the induction areas with a second phase shift 34*b*. The second phase shift 34*b* differs from the first phase shift 32*b*. In the second control interval 28*b*, the control unit operates the further induction area with a further second phase shift 98*b* with respect to the induction area.

FIG. 7 shows a circuit diagram of an alternative induction device 10*c* in a schematic representation. The induction device 10*c* has four induction areas 12*c*, 14*c*, 16*c*, 18*c*. Each of the induction areas is supplied with electrical energy in a matrix multi-inverter topology. Each of the induction areas 12*c*, 14*c*, 16*c*, 18*c* has five inductors 106*c* in each case. An inverter unit 38*c* is assigned to each of the induction areas 12*c*, 14*c*, 16*c*, 18*c*. Each of the inverter units 38*c* has a first switching element 40*c* and five second switching elements 42*c* in each case. Each of the switching elements 40*a*, 42*c* is embodied in each case as a transistor, namely as a bipolar transistor with an insulated gate electrode. Separate control of the individual inductors 106*c* of the respective induction areas 12*c*, 14*c*, 16*c*, 18*c* is enabled by means of the switching elements 42*c*.

The invention claimed is:

1. An induction device, comprising:

a plurality of induction areas which are controllable independently from one another; and a controller configured to control the plurality of induction areas within a control period from a first control interval and a second control interval repetitively with an alternating current frequency and to supply the plurality of induction areas with energy, wherein the induction areas are configured as individual inductors or as a plurality of inductors configured to be jointly controlled by said controller, said controller operating in the first control interval at least two of the plurality of induction areas with a first phase shift to minimize interference, wherein the controller calculates a phase angle of the first phase shift from a quotient from 180° and a number of the plurality of induction areas to be operated simultaneously within the first control interval.

2. The induction device of claim 1, constructed in the form of an induction cooking appliance device.

3. The induction device of claim 1, wherein the controller operates in the second control interval the at least two of the plurality of induction areas with a second phase shift which differs from the first phase shift.

4. The induction device of claim 3, wherein the controller operates in the second control interval at least a further one of the plurality of induction areas with a further second phase shift.

5. The induction device of claim 1, wherein the controller operates in the first control interval at least a further one of the plurality of induction areas with a further first phase shift.

6. The induction device of claim 1, wherein at least one of the first and second control intervals has a duration which is shorter than half a cycle time of a mains alternating voltage.

7. The induction device of claim 1, wherein the control period has a duration which is shorter than half a cycle time of a mains alternating voltage.

8. The induction device of claim 1, wherein the controller controls in at least one of the first and second control intervals at least one of the plurality of induction areas with the alternating current frequency and at least a further one of the plurality of induction areas with a further alternating current frequency which differs from the alternating current frequency.

9. The induction device of claim 8, wherein the further alternating current frequency is an integral multiple of the alternating current frequency.

10. The induction device of claim 1, wherein the controller controls in at least one of the first and second control intervals at least two of the plurality of induction areas with a same alternating current frequency.

11. The induction device of claim 1, wherein the controller controls in at least one of the first and second control intervals the at least two of the plurality of induction areas with a same alternating current frequency.

12. The induction device of claim 1, wherein the controller controls in the first control interval at least two of the induction areas with a same alternating current frequency.

13. The induction device of claim 1, wherein the controller controls in the first control interval the at least two of the induction areas with a same alternating current frequency.

14. The induction device of claim 1, wherein based on a number of the plurality of induction areas to be operated simultaneously within the first control interval, the controller selects a phase angle for the first phase shift from a catalog of phase angles.

15. An induction cooking appliance, comprising an induction device, said induction device comprising a plurality of induction areas, and a controller configured to control the plurality of induction areas within a control period from a first control interval and a second control interval repetitively with an alternating current frequency and to supply the plurality of induction areas with energy, wherein the induction areas are configured as individual inductors or as a plurality of inductors configured to be jointly controlled by a controller, said controller operating in the first control interval at least two of the plurality of induction areas with a first phase shift to minimize interference, wherein a phase angle of the first phase shift is calculated from a quotient from 180° and a number of the plurality of induction areas to be operated simultaneously within the first control interval.

16. The induction cooking appliance of claim 15, constructed in the form of an induction hob.

17. A method for operating an induction device, comprising:

controlling a plurality of induction areas independently of one another within a control period from a first and second consecutive control intervals repetitively with an alternating current frequency and to supply the plurality of induction areas with energy, wherein the induction areas are configured as individual inductors or as a plurality of inductors configured to be jointly controlled by a controller; and operating at least two of the plurality of induction areas with a first phase shift to minimize interference influence in at least one of the first and second consecutive control intervals, wherein a phase angle of the first phase shift is calculated from a quotient from 180° and a number of the plurality of induction areas to be operated simultaneously within the first control interval.

18. The method of claim 17, further comprising operating the at least two of the plurality of induction areas in the second control interval with a second phase shift which differs from the first phase shift.

19. The method of claim 17, further comprising operating the controller such that at least one of the first and second control intervals has a duration which is shorter than half a cycle time of a mains alternating voltage.

* * * * *